United States Patent [19]
Clemens et al.

[11] 3,992,936
[45] Nov. 23, 1976

[54] YARN MEASURING INSTRUMENT

[75] Inventors: Robert W. Clemens, Malverne, N.Y.; Edward W. Schussel, King of Prussia, Pa.

[73] Assignee: Wesco Industries Corporation, Plainview, N.Y.

[22] Filed: June 23, 1975

[21] Appl. No.: 589,622

[52] U.S. Cl. .................................. 73/160; 33/129
[51] Int. Cl.² ......................................... G01L 5/04
[58] Field of Search ............... 73/160; 33/127, 129, 33/133

[56] References Cited
UNITED STATES PATENTS

| 3,788,138 | 1/1974 | Heusser | 73/160 |
| 3,805,607 | 4/1974 | Heusser | 73/160 |

*Primary Examiner*—Richard C. Queisser
*Assistant Examiner*—Joseph W. Roskos
*Attorney, Agent, or Firm*—Henry R. Lerner

[57] ABSTRACT

A yarn measuring instrument having a rotatably mounted operative element whose rotation in response to frictional engagement thereof by travelling yarn cooperates with electronic circuit means to measure a plurality of characteristics of the travelling yarn is provided with means for capturing the travelling yarn and placing it in frictional engagement with the operative element. The yarn capturing means includes an arm which has a free end provided with yarn retaining means. The arm is mounted within the instrument for movement between a projected position thereof in which the yarn retaining means extends outwardly of the instrument and a retracted position thereof in which the yarn retaining means extends inwardly of the instrument, whereby travelling yarn captured in the retaining means when the arm is in its projected position automatically frictionally engages the operative element when the arm is moved to its retracted position.

10 Claims, 6 Drawing Figures

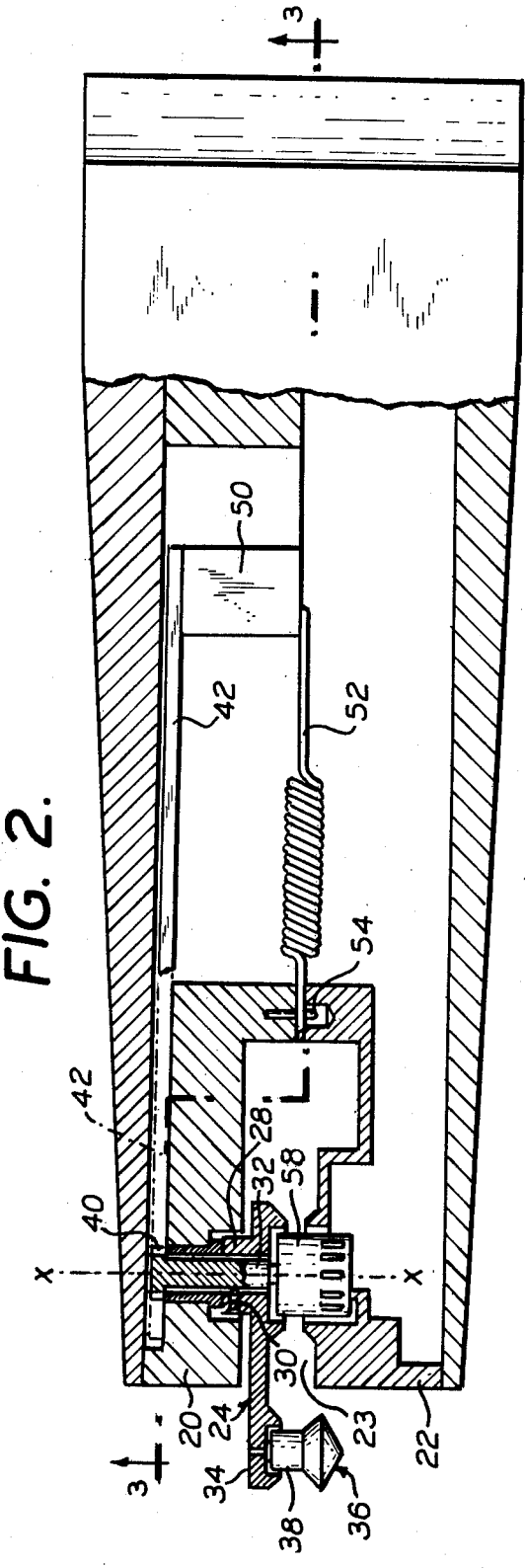
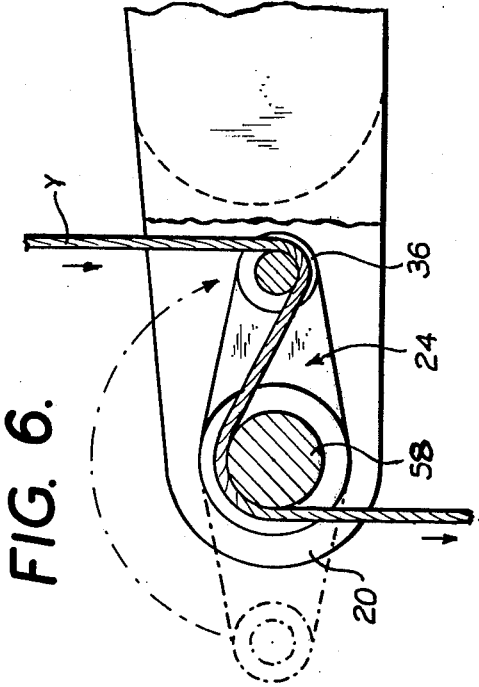
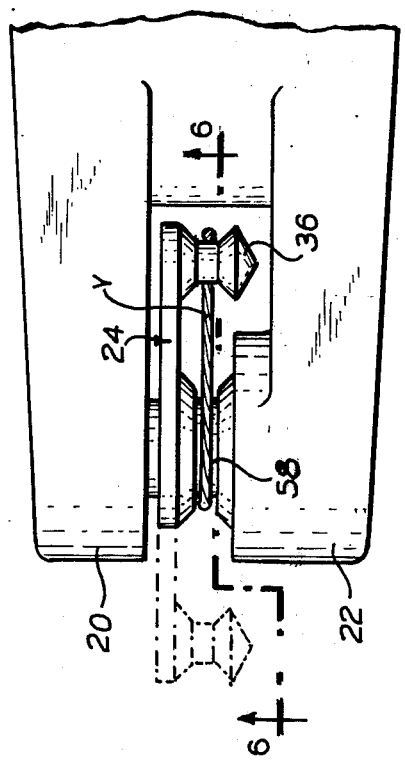

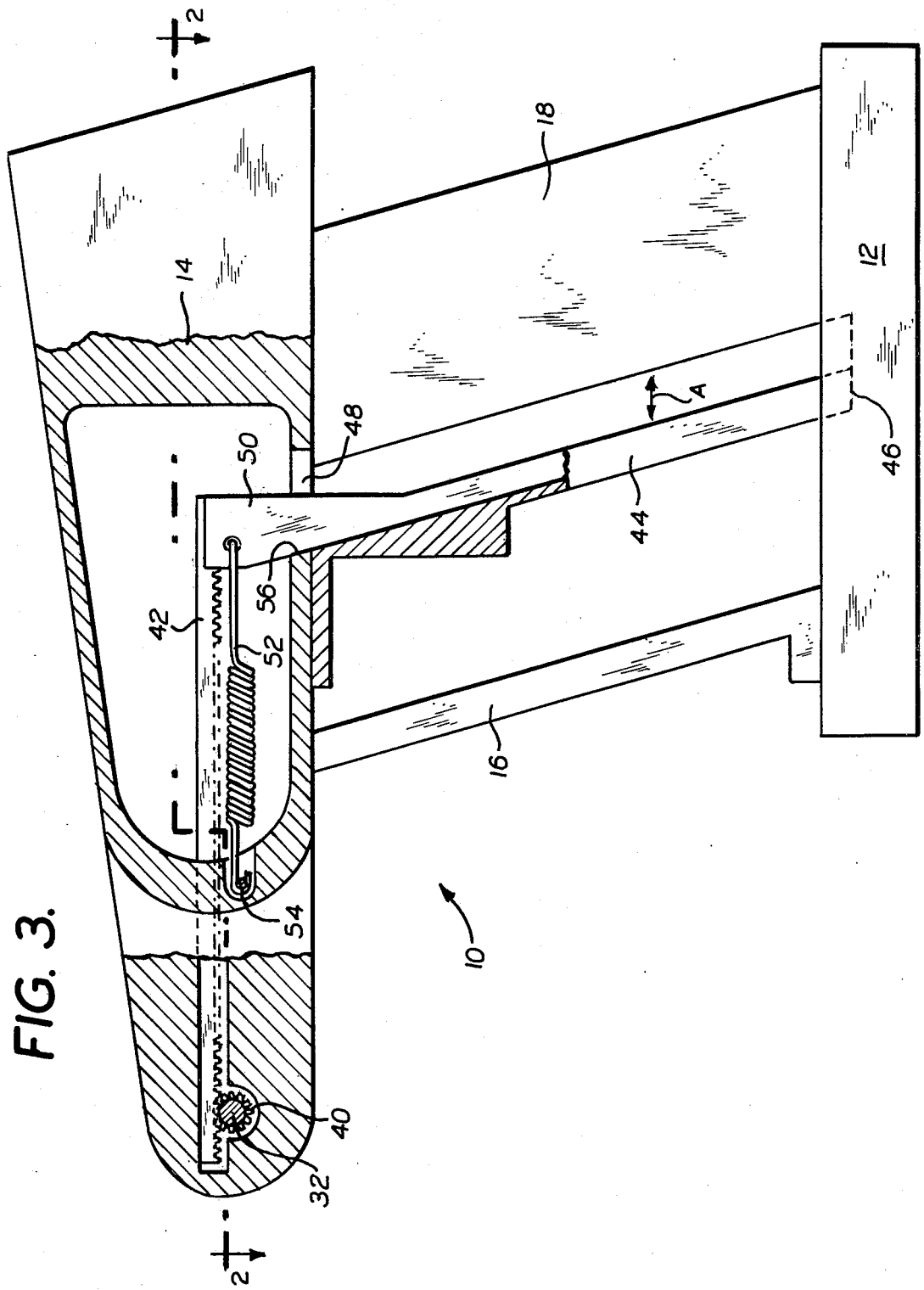

YARN MEASURING INSTRUMENT

BACKGROUND OF THE INVENTION

The present invention relates to a portable measuring instrument adapted to measure any one of a number of characteristics of moving yarn.

More specifically, it is of great importance to monitor yarn being utilized by a knitting machine for the purpose of determining, at any time, a number of characteristics of such moving yarn as, for example, the linear rate at which said yarn is moving, the amount of yarn consumed per revolution of the circular knitting machine utilizing such yarn, and the tension of the moving yarn. These and other characteristics of moving yarn are valuable for the purpose of determining whether the knitting machine is operating satisfactorily as well as for the purpose of making appropriate adjustments in the operation of the knitting machine in order to produce more uniformly knit goods.

Instruments providing these measurements are well known in the art and usually include an operative element such as a rotatable drum or ring about which the yarn is wrapped so that the operative element is rotated by the moving yarn. By means of conventional electronic circuitry, the rotation of the operative element is converted into the desired characteristic of the yarn.

The main problem encountered in presently used yarn measuring instruments is that of capturing the moving yarn and wrapping it about the operative element. More specifically, in existing yarn measuring instruments, the operative element (rotatable drum or wheel) is located in the forwardmost portion of the measuring instrument requiring the operator to directly place such operative element in engagement with the moving element. Such operation requires skill on the part of the operator who must gain access to the yarn and maintain frictional engagement of the yarn with the operative element. As a result, such existing prior art instruments are fairly cumbersome and far less than satisfactory.

SUMMARY OF THE INVENTION

In accordance with the invention, there is provided a portable yarn measuring instrument which includes an operative element and highly improved means for capturing the moving yarn and placing it in engagement with the operative element. More specifically, the yarn measuring instrument in accordance with the invention is provided with a yarn capturing element including an arm which normally projects outwardly of the instrument and terminates in a freewheeling lug having a reduced diameter portion. In such normal position of the yarn capturing element, the operator can easily capture the travelling yarn within the freewheeling lug after which the yarn capturing element is moved to its retracted position, against the action of a spring, causing the yarn to automatically wrap about the operative element which is mounted for rotation within the instrument. The movement of the yarn capturing element from its normally forwardly projected position to its rearwardly retracted position is accomplished by simply squeezing a trigger which causes movement of a rack and accompanying pinion to in turn cause rotation of the yarn capturing element. In accordance with this construction, the operator need not be concerned about the engagement of the yarn with the operative element since this is automatically accomplished after the yarn has been captured within the yarn capturing element and the trigger has been squeezed. In accordance with the invention, therefore, all the operator needs to do is merely to place the instrument so that the moving yarn is held captive within the yarn capturing element which greatly reduces the skill required and considerably improves the simplicity of operation of the instrument.

For further simplicity of operation the apparatus in accordance with the invention is generally shaped in the form of a gun so that it can easily be hand gripped, with the squeezing of the trigger causing retraction of the yarn capturing element for engagement with the operative element of the measuring instrument. The instrument is portable and contains within its housing all of the necessary electrical components as well as a rechargeable battery, rendering such instrument extremely flexible for use throughout a mill.

BRIEF DESCRIPTION OF THE DRAWINGS

FIG. 2 is a top plan view thereof, partly in section, along line 2—2 of FIG. 3;

FIG. 3 is a side elevational view thereof, partly in section, taken along line 3—3 of FIG. 2;

FIG. 5 is a top plan view of the forward portion of the instrument, showing both positions of the yarn capturing element; and FIG. 6 is a sectional view taken along line 6—6 of FIG. 5.

DESCRIPTION OF THE PREFERRED EMBODIMENT

Figure 1:
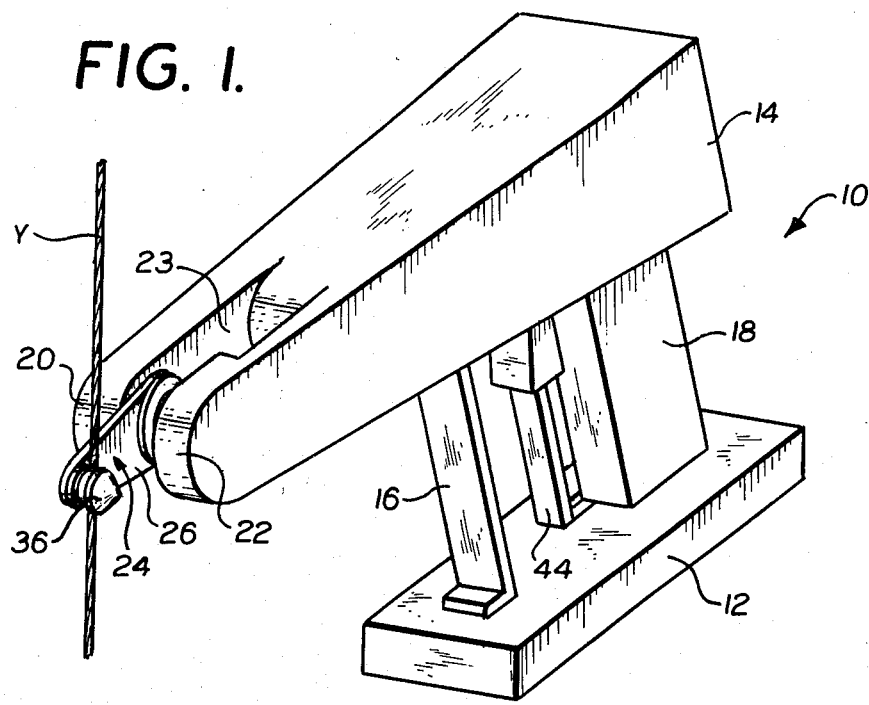
FIG. 1 is an elevational perspective view of the portable yarn measuring instrument in accordance with the invention.

Referring to FIG. 1, there is shown a portable measuring device 10 in accordance with the invention, which portable device is adapted to engage and hold captive moving yarn for subsequent placement of such yarn in engagement with an operative element. The operative element forms part of a conventional system for measuring any one of a plurality of characteristics of said moving yarn such as, for example, the linear velocity of the yarn, the amount of yarn consumed per revolution of the knitting machine utilizing such yarn, the tension of the yarn, or any one of a number of other characteristics of a moving yarn capable of being detected by engagement of said yarn with what is referred to herein as the operative element. In this connection, it is important to note that the present invention does not relate to the operative element or the specific systems associated therewith for making the various intended measurements, such systems being of conventional electronic nature which do not form part of the present invention.

The invention relates instead to the improved means for capturing control of the moving yarn and placing such moving yarn in operative engagement with the operative element.

Device 10, as best shown in the figures, comprises base 12 and upper housing 14, held in spaced apart disposition by spacer bar 16 and gripping member 18. The arrangement of the various parts forming device 10 is such as to enable the device to be conveniently hand held, much in the way a pistol is held, with gripping member 18 defining the pistol grip of the device. Upper housing 14 is U-shaped at its forward end to define leg portions 20 and 22 spaced from each other by gap 23.

As best shown in FIG. 2, there is a yarn capturing element 24 which extends into gap 23 and includes an arm 26 terminating at one end into a hub 28 secured by means of set screw 30 to a shaft 32 for pivotable movement to unison therewith, which shaft 32 is appropriately supported within leg 20 for rotation about axis x—x. The free end 34 of arm 26 carries a free wheeling lug 36 having a reduced diameter portion 38.

A pinion gear 40 is carried at the end of shaft 32 and engages a rack 42 mounted within leg 22 for longitudinal movement therein. A trigger member 44 extends from base 12 into upper housing 14, appropriately slotted as at 46 and 48, respectively, to permit back and forth slideable movement of trigger member 44 in the direction of arrow A. Upper portion 50 of trigger member 44, located within upper housing 14, has secured thereto the rear end of rack 42 as well as the rear end of tension spring 52, the other end of which spring is fixed to upper housing 14 as by means of pin 54. Spring 52 normally biases the trigger member 44 to its forwardmost position as shown by the full lines in FIG. 4, such position being defined by engagement of the trigger with the forward end of slot 48, as at 56. In such normally biased position of trigger member 44, the rack 42, through its engagement with pinion gear 40, causes shaft 32 to be rotated to a position wherein yarn capturing member is in a forwardly projected position as shown in FIGS. 1, 2 and the solid lines in FIG. 4. When the trigger member is squeezed, causing it to move rearwardly against the action of spring 52, the resulting movement of rack 42 causes rotation of pinion gear 40 and shaft 32, thereby moving yarn capturing member 24 to a retracted position as shown by the dashed lines in FIG. 4.

As best seen in FIG. 2, shaft 32, at the end thereof opposite pinion 40, freely supports drum-like element 58 which extends into leg 22. Drum 58 constitutes the above referred to operative element of conventional electronic measuring circuitry and components (not shown) to provide appropriate measurements based upon the rotation imparted to said drum. Said circuitry and components, which do not form part of the present invention, are located within upper housing 14 and gripping member 18, with a readout being provided at the rear wall of the housing.

The operation of device 14 will now be described.

The portable device is hand held at pistol grip 18 without squeezing the trigger. In this condition, yarn capturing element 24 is in its forwardly projected position with arm 26 and lug 36 thereof projecting outwardly of gap 23. In this condition device 10 is easily manipulated so as to capture and guide moving yarn Y within reduced diameter portion 38 which defines a recess for retaining and guiding the yarn and preventing it from being dislodged, such condition being shown in FIG. 1 and by the full lines in FIG. 4.

Figure 4:
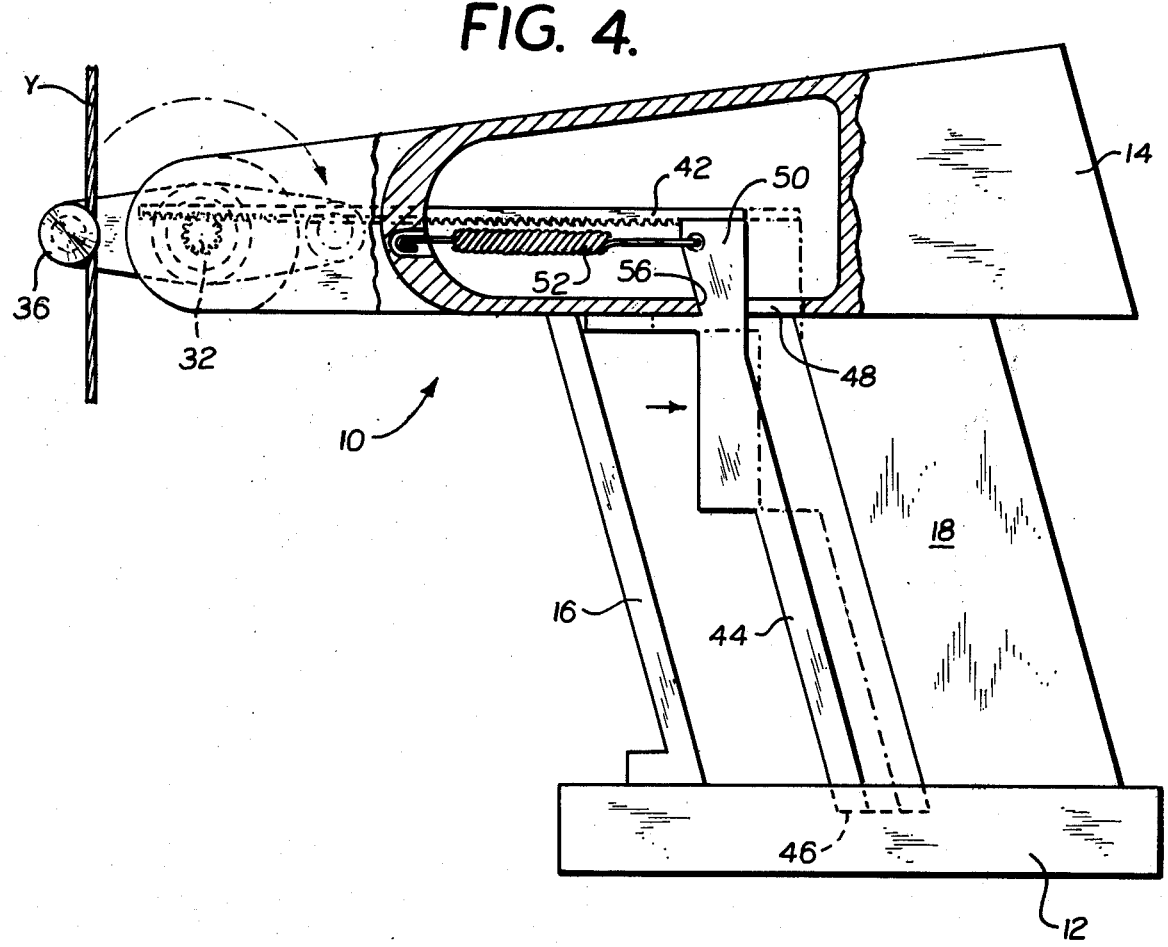
FIG. 4 is a side elevational view thereof with parts broken away showing both positions of the yarn capturing element.

Once the yarn is held captive within the recess portion of lug 36, the operator squeezes trigger 44 causing the latter to move rearwardly against the action of the spring and, through the intermediary of rack 42, pinion gear 40 and shaft 32, causes clockwise (viewing FIG. 1 and FIG. 4) rotation of yarn capturing member 24 whereby such member occupies its retracted position as shown by the dashed lines in FIG. 4. Such retracted position is also shown, on an enlarged scale, in FIGS. 5 and 6 from which it is apparent that in such position yarn Y is wrapped about drum 58 and held thereagainst with sufficient tension to cause rotation thereof. Such rotation is in turn translated through conventional circuitry into the desired measurement relating to the yarn velocity or other characteristic thereof. When such measurement has been completed as read on the apparatus, the trigger is released permitting the yarn capturing element to reassume its normal forwardly projected position in which slight manipulation of the device disengages the yarn therefrom.

The entire operation, therefore, is one of the utmost simplicity which enables the capturing of yarn for measurement purposes without difficulty whatsoever. More specifically, it is the utilization of yarn capturing element 24, which is of relatively small size as compared to the rest of the apparatus, which makes it possible to reach nearly anywhere along the path of travelling yarn to easily capture the same so that it can then simply be placed into engagement with the operative element which is part of the measuring instrument.

While reference has been made herein to the application of the subject invention to travelling yarn in a knitting machine and, specifically, a circular knitting machine, it will be understood that the invention is equally applicable to the measuring of any moving filament or yarn no matter what particular machine such travelling yarn is associated with.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described our invention, what we claim and desire to secure by letters patent is:

1. In a yarn measuring instrument having a rotatably mounted operative element whose rotation in response to frictional engagement thereof by travelling yarn cooperates with electronic circuit means to measure a plurality of characteristics of said travelling yarn, means for capturing said travelling yarn and placing said captured travelling yarn in frictional engagement with said operative element comprising, an arm having a free end provided with yarn retaining guide means, said arm being mounted within said instrument for movement between a projected position thereof in which said yarn retaining guide means extends outwardly of said instrument and a retracted position thereof in which said yarn retaining guide means extends inwardly of said instrument, whereby travelling yarn captured in said retaining guide means when said arm is in said projected position thereof automatically frictionally engages and drives said operative element when said arm is moved to said retracted position thereof.

2. The improvement in accordance with claim 1, wherein said arm is normally urged by spring biasing means into said projected position thereof and is movable against the action of said spring biasing means into said retracted position thereof.

3. The improvement in accordance with claim 2, wherein said arm is mounted for pivotal movement about an axis of rotation coincident with the axis of rotation of said rotatably mounted operative element.

4. The improvement in accordance with claim 2, wherein there is further provided trigger means operatively associated with said arm and said spring biasing means whereby squeezing of said trigger means causes said arm to move to said retracted position thereof and release of said trigger means causes said arm to move to said projected position thereof.

5. The improvement in accordance with claim 1, wherein said arm is mounted for pivotal movement about an axis of rotation coincident with the axis of rotation of said rotatably mounted operative element.

6. The improvement in accordance with claim 5, wherein there is further provided,
   a. a shaft to which said arm is secured for said pivotal movement thereof,
   b. a pinion gear mounted on said shaft and movable in unison therewith,
   c. rack means in engagement with said pinion gear, and
   d. spring means operatively associated with said rack means and normally biasing said rack means into a first position thereof causing said pinion gear and shaft to pivot said arm into said projected position thereof,
   e. said rack means being movable against said spring bias into a second position thereof causing said pinion gear and shaft to pivot said arm into said retracted position thereof.

7. The improvement in accordance with claim 6, wherein there is further provided trigger means to which said rack means and spring means are secured whereby squeezing of said trigger means causes said rack means to move against said spring bias into said second position thereof and release of said trigger means causes said spring means to bias said rack means into said first position thereof.

8. The improvement in accordance with claim 6, wherein said yarn retaining means comprise a free wheeling lug having a reduced diameter portion in which said travelling yarn is retained and held captive.

9. The improvement in accordance with claim 1, wherein said yarn retaining means comprise a free wheeling lug having a reduced diameter portion in which said travelling yarn is retained and held captive.

10. The improvement in accordance with claim 1, wherein there is further provided trigger means operatively associated with said arm whereby squeezing of said trigger causes said arm to move from said projected position thereof to said retracted position thereof.

* * * * *